United States Patent
Lenormand et al.

(10) Patent No.: US 6,430,392 B1
(45) Date of Patent: Aug. 6, 2002

(54) DYNAMIC COMPENSATION OF SIGNALS FOR SPACE TELECOMMUNICATION REPEATERS

(75) Inventors: Régis Lenormand, Blagnac; Eric Clement Belis, Toulouse; Jean Bouin, Toulouse; Luc Delamotte, Toulouse; Christian Rigal, Toulouse; Muriel Aveline, Toulouse, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/280,668

(22) Filed: Mar. 29, 1999

(30) Foreign Application Priority Data

Mar. 30, 1998 (FR) .............................................. 98 03897

(51) Int. Cl.$^7$ .............................................. H04B 7/185
(52) U.S. Cl. ...................... 455/12.1; 455/13.4; 455/427
(58) Field of Search .............................. 455/12.1, 13.2, 455/13.4, 428, 427

(56) References Cited

U.S. PATENT DOCUMENTS

| | | | |
|---|---|---|---|
| 4,901,307 A | * 2/1990 | Gilhousen et al. | 370/18 |
| 5,257,283 A | * 10/1993 | Gilhousen et al. | 455/69 |
| 5,265,119 A | * 11/1993 | Gilhousen et al. | 455/54.1 |
| 5,568,086 A | 10/1996 | Schuss et al. | 330/124 R |
| 5,754,942 A | * 5/1998 | Wachs | 455/13.4 |
| 5,787,336 A | * 7/1998 | Hirschfield et al. | 455/13.4 |
| 5,894,473 A | * 4/1999 | Dent | 455/450 |
| 5,918,176 A | * 6/1999 | Arrington, Jr. et al. | 455/430 |
| 5,924,015 A | * 7/1999 | Garrison et al. | 455/13.4 |
| 6,081,710 A | * 6/2000 | Sherman et al. | 455/13.4 |

FOREIGN PATENT DOCUMENTS

| | | |
|---|---|---|
| EP | 0 668 666 A2 | 8/1995 |
| EP | 0 805 568 A1 | 11/1997 |

OTHER PUBLICATIONS

A. D. Craig et al, "Digital Signal Processing in Communications Satellite Payloads", Electronics And Communications Engineering Journal, vol. 4, No. 3, Jun. 1, 1992, pp. 107–114.

* cited by examiner

Primary Examiner—Daniel Hunter
Assistant Examiner—Thuan T. Nguyen
(74) Attorney, Agent, or Firm—Sughrue Mion, PLLC

(57) ABSTRACT

A satellite for a satellite telecommunication system transmits signals at different powers on the downlink connection. The powers are chosen to limit the relative dynamic range of signals received on the downlink connection. The relative dynamic range of signals received on the downlink connection is advantageously less than 5 dB and preferably less than 2 dB. A digital processor circuit is used, together with an analog-digital converter, a circuit taking the fast Fourier transform of the converted signals, a circuit for monitoring the gain of the signals, a circuit for switching the signals to at least two amplifier subsystems each including an inverse fast Fourier transform circuit, a digital-analog converter and a power amplifier.

8 Claims, 1 Drawing Sheet

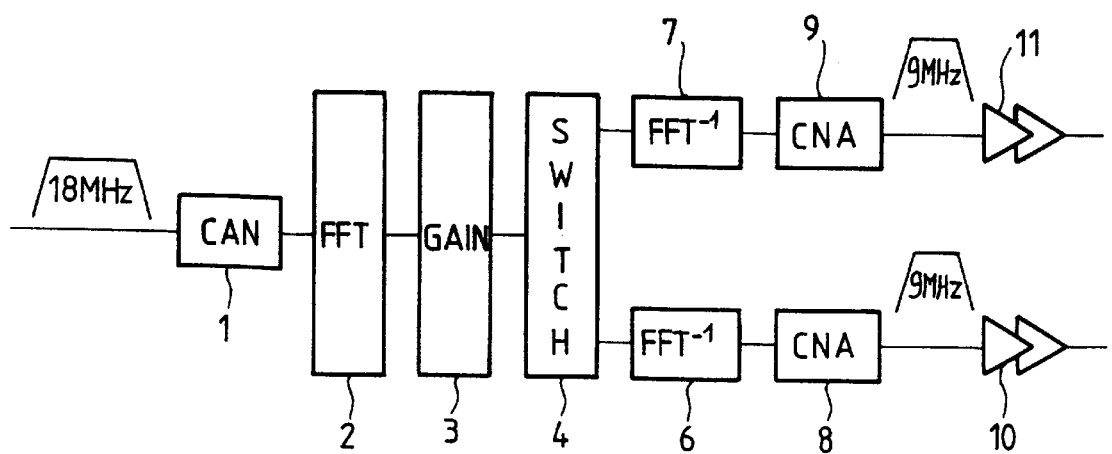

DYNAMIC COMPENSATION OF SIGNALS FOR SPACE TELECOMMUNICATION REPEATERS

BACKGROUND OF THE INVENTION

1. Field of the Invention

The present invention consists in a satellite for a telecommunication system. It also consists in a method of dynamic compensation of signals for a satellite of the above kind.

2. Description of the Prior Art

The invention concerns satellite telecommunications and more precisely space telecommunication system repeaters. In space telecommunication systems signals transmitted by satellites or repeaters to earth stations are attenuated differently and received with greatly different powers. The higher the frequency the greater the difference, which can be as high as 20 dB at 30 GHz when there is high local precipitation.

Equipment cost constraints, and in particular those affecting mobile equipment for satellite telecommunication systems, lead to a reduction in the capacities of the equipment; the equipment is then unable to compensate power losses of this magnitude. This is particularly critical for future satellite systems operating in the Ka band; for such systems the coverage of a given satellite is much larger than the typical dimension of such climatic phenomena. There therefore coexist in the downlink transmission channel signals having differences of level that can be as high as 20 dB, for similar data bit rates. Power differences of this magnitude make spurious coupling phenomena critical and accentuate the impact of amplifier non-linearities.

Attenuation problems of the above kind also arise on the uplink connections, on which level differences of this magnitude can occur.

EP-A-0 289 130 describes the problem of intermodulation products between different frequencies of a radio transmitter caused by non-linearities of the power amplifier; it proposes the provision of a series of predistortion circuits, a chosen circuit being connected downstream of the mixer device of the transmitter and upstream of the power amplifier and the antenna. The predistortion circuit used is selected according to the frequency of the signal to be transmitted and induces in the signals distortion opposite to that induced by the amplifier for the frequency range concerned. This reduces intermodulation products between the different frequencies to levels below 40 dB. The above document suggests only precompensation varying in accordance with the frequency to assure linear amplification of the signal throughout the wanted band.

Compensation of the kind proposed in EP-A-0 289 130 is insufficient in the case of a space telecommunication repeater in that at best it can compensate attenuation differences on the uplink transmission part. The same problems of link attenuation arise for the downlink part: a signal transmitted in an area with heavy precipitation is more attenuated, which increases the dynamic range of the signal received by the terrestrial equipment.

Document EP 0 805 568 describes a power control method and device for limiting the dynamic range of the signal received by the terrestrial equipment. To this end the ground equipment includes a control loop acting on the entire system. This configuration has the advantage of providing precise results in terms of limiting the dynamic range of the signal received by the terrestrial equipment but the disadvantage of using a complex structure requiring considerable modification of the ground equipment without having a transparent action on the signals transmitted.

The invention proposes a solution to the problem of fluctuations in the attenuation of different signals in a space telecommunication system; it proposes a solution that not only compensates the attenuation differences on the uplink transmission part but also precompensates attenuation differences on the downlink transmission part, without modifying the ground equipment and without interfering with the architecture of the satellite.

SUMMARY OF THE INVENTION

To be more precise, the invention proposes a satellite for a satellite telecommunication system including means for transmitting signals at different powers on the downlink connection enabling transparent digital processing of the signals in the satellites so that the powers are chosen to limit the relative dynamic range of the signals received on the downlink connection.

"Transparent processing" means processing that does not modify the waveform of the signal and which is therefore transparent with regard to information transmitted by the satellite. In particular, transparent processing does not include any encoding or decoding, modulation or demodulation step.

The relative dynamic range of the signals received on the downlink connection is advantageously less than 5 dB and preferably less than 2 dB.

In one embodiment, the transmitter means comprise at least two amplifiers and means for routing signals to the amplifiers in accordance with the transmitter power to be applied to the signals.

The satellite preferably includes means for compensating power differences of signals applied to a given amplifier.

In one embodiment, the transmitter means comprise an analog-digital converter, fast Fourier transform means for converting the converted signals, signal gain control means, means for routing signals to at least two amplifier subsystems each including Inverse fast Fourier transform means, a digital-analog converter and a power amplifier.

The invention also proposes a method of dynamically compensating signals for space telecommunication transparent digital repeaters, the method comprising a step of separating signals received into at least two groups and a step of transmitting signals of the groups at different powers according to the group, the powers being chosen to limit the relative dynamic range of signals received on the downlink connection.

The relative dynamic range of signals received on the downlink connection is advantageously less than 5 dB and preferably less than 2 dB.

In one embodiment, the step of transmitting signals of a group includes a step of equalizing the powers of the signals of the group and a step of amplifying the signals.

Other features and advantages of the invention will become apparent on reading the following description of embodiments of the invention given by way of example and with reference to the accompanying drawings in which the single FIGURE is a diagrammatic view of a compensator circuit in accordance with the invention.

DETAILED DESCRIPTION OF THE PREFERRED EMBODIMENT

The invention proposes to amplify the signals differently in the power subsystem of a satellite to limit the dynamic range of attenuation of signals on the downlink connection and where appropriate on the uplink connection. This transparent digital processing precompensates the dynamic range of attenuation on the downlink connection and for example enables transmission at a higher power of signals to be received in an area with high precipitation, or more generally in an area in which the power attenuation is greater, without modifying the architecture of the ground equipment. The power differences between the various signals transmitted by the satellite can vary in accordance with predicted fluctuations in attenuation on the downlink connection: a value of 18 dB for power values around 20 GHz can compensate heavy precipitation, for example, relative to an identical data bit rate in an area where the sky is clear. The receive dynamic range on the downlink connection is preferably less than 5 dB and even more preferably less than 2 dB. In contrast, as mentioned above, the receive dynamic range in prior art devices can be as high as 18 dB or 20 dB.

The signal amplification level or the various power levels can be chosen in different ways. Information transmitted by the ground stations to the space repeater can be used for this purpose, indicating the various attenuations. The power levels can also be varied in accordance with the level of the signals received by the repeater in the areas of transmission on the uplink connection. This determines the power levels to be applied on transmission on the downlink connection to precompensate fluctuations in attenuation on the downlink connection, i.e. to limit the dynamic range of signals on the downlink connection. The specific different power levels chosen depend on the repeater concerned and propagation conditions on the downlink connection.

The outcome is that the terrestrial equipment is not modified and receives signals of substantially identical power, despite local conditions that differ between the various terrestrial equipments. For equipments such as mobile terminals, this assures correct reception of signals on the downlink connection, limiting the cost of the equipment. The result can easily be verified by measuring the received power levels on the downlink connection.

The invention advantageously proposes to preserve constant linearity performance using different amplifiers for the different power levels transmitted. This limits the impact of amplifier non-linearities; in the case of a single amplifier, applying signals with very different levels could impose a penalty. In addition to the various amplifiers, means are then provided for routing the signals to the amplifiers in accordance with the power level to be applied to them. In this way a group of signals applied to a given amplifier has applied to it the power level to precompensate the fluctuations in attenuation on the downlink connection for the group, relative to the signals of another group.

The single FIGURE is a diagram of an amplifier circuit in accordance with the invention which can be used to implement the invention. The amplifier circuit shown in the FIGURE amplifies the signals using two separate amplifiers. The circuit shown in the FIGURE comprises an analog-digital converter 1 which receives at its input analog signals received by the repeater. The total bandwidth of these signals is typically 18 MHz.

The digital signals obtained are transmitted to fast Fourier transform means 2 which take their fast Fourier transform.

The signals in the frequency domain are transmitted to gain control means 3 which precompensate the downlink connection and where appropriate compensate the uplink connection. To this end, the gain control means can equalize the gain of the various signals received on the uplink connection and vary the gain of the signals in accordance with the expected or predicted attenuation fluctuations on the downlink connection. This precompensation of the downlink connection can be determined in various ways, as explained above. In the situation shown in the FIGURE, where two amplifiers are used, a gain value can be used for each amplifier and one of these values chosen for each signal to be transmitted. The gain value can also be chosen allowing for non-linearities of each amplifier, to assure constant linearity in each amplifier.

The signals supplied by the gain control means 3 are then fed to routing means 4, denoted SWITCH in the FIGURE. The routing means route the various signals to one or other of the two amplifier subsystems, depending on the power of the signals; to this end the routing means group the signals by assigning them frequencies corresponding to the various amplifier subsystems.

Each amplifier subsystem includes inverse Fourier transform $FFT^{-1}$ means 6 or 7 followed by a digital-analog converter 8 or 9 and a power amplifier 10 or 11. Each amplifier subsystem receives signals to be transmitted at a given power level from the routing means; the signals supplied to an amplifier subsystem by the routing means undergo the inverse Fourier transform. The signals in the time domain obtained are converted into analog signals, amplified by the power amplifier and transmitted by the repeater. Each amplifier subsystem transmits signals in a 9 MHz band corresponding to half the initial band received by the repeater.

The circuit shown in the FIGURE transmits from a repeater of a space telecommunications system signals having a dynamic range which compensates fluctuations in attenuation on the uplink connection and precompensates fluctuations in attenuation on the downlink connection. This is achieved by dynamic routing of received signals to one or other of the amplifier subsystems, according to the power level needed.

The invention applies to satellite telecommunication systems such as multimedia systems.

Of course, the present invention is not limited to the examples and embodiments described as shown, but is open to many variants that will suggest themselves to the skilled person. Thus the invention has been described in the case of a circuit having two amplifier subsystems; clearly the number of amplifier subsystems used can be varied; in this case, the routing means separate and group the signals in accordance with the number of amplifiers and the number of power levels required.

What is claimed is:

1. A satellite for a satellite telecommunication system including means for transmitting signals at different powers on the downlink connection enabling transparent digital processing of said signals in said satellite so that said powers are chosen to limit the relative dynamic range of said signals received on said downlink connection.

2. The satellite claimed in claim 1 wherein said relative dynamic range of said signals received on said downlink connection is less than 5 dB and preferably less than 2 dB.

3. The satellite claimed in claim 1 wherein said transmitter means comprise at least two amplifiers and means for routing signals to said amplifiers in accordance with the transmitter power to be applied to said signals.

4. The satellite claimed in claim 3 including means for compensating power differences of signals applied to a given amplifier.

5. The satellite claimed in claim 1 wherein said transmitter means comprise an analog-digital converter, fast Fourier transform means for converting the converted signals, signal gain control means, means for routing signals to at least two amplifier subsystems each including inverse fast Fourier transform means, a digital-analog converter and a power amplifier.

6. A method of dynamically compensating signals for space telecommunication transparent digital repeaters, said method comprising a step of separating signals received into at least two groups and a step of transmitting signals of said groups at different powers according to the group, said powers being chosen to limit the relative dynamic range of signals received on the downlink connection.

7. The method claimed in claim 6 wherein said relative dynamic range of signals received on said downlink connection is less than 5 dB and preferably less than 2 dB.

8. The method claimed in claim 6 wherein said step of transmitting signals of a group includes a step of equalizing the powers of said signals of said group and a step of amplifying said signals.

\* \* \* \* \*